US006819922B1

(12) United States Patent
Janz

(10) Patent No.: US 6,819,922 B1
(45) Date of Patent: Nov. 16, 2004

(54) PERSONAL DIGITAL ASSISTANT VEHICLE INTERFACE AND METHOD

(75) Inventor: Susan M. Janz, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 468 days.

(21) Appl. No.: 09/639,301

(22) Filed: Aug. 14, 2000

(51) Int. Cl.[7] .............................................. H04M 3/00
(52) U.S. Cl. .................... 455/420; 455/66.1; 455/556.2
(58) Field of Search ................................ 455/456, 457, 455/556, 557, 414, 410, 404, 66, 420, 66.1, 556.2, 345, 346, 569.2; 340/425.5, 7.1, 7.54, 7.62, 7.57, 384.1, 384.5, 384.7

(56) References Cited

U.S. PATENT DOCUMENTS

| | | | |
|---|---|---|---|
| 5,515,305 A | 5/1996 | Register et al. ......... | 364/709.15 |
| 5,606,594 A | 2/1997 | Register et al. ............... | 379/58 |
| 5,699,244 A | 12/1997 | Clark, Jr. et al. ........... | 364/420 |
| 5,708,816 A | 1/1998 | Culbert ....................... | 395/737 |
| 5,778,256 A | 7/1998 | Darbee ....................... | 395/892 |
| 5,819,227 A | 10/1998 | Obuchi .......................... | 705/1 |
| 5,877,897 A * | 3/1999 | Schofield et al. ........... | 359/604 |
| 5,917,405 A * | 6/1999 | Joao ............................. | 340/426 |
| 5,938,721 A | 8/1999 | Dussell et al. ............... | 701/211 |
| 5,960,297 A | 9/1999 | Saki ............................ | 438/424 |
| 5,983,073 A | 11/1999 | Ditzik ........................ | 455/11.1 |
| 6,034,621 A | 3/2000 | Kaufman ................ | 340/825.44 |
| 6,087,953 A * | 7/2000 | DeLine et al. ........... | 340/815.4 |
| 6,148,212 A * | 11/2000 | Park et al. ................... | 455/456 |
| 6,154,658 A * | 11/2000 | Caci ............................ | 455/466 |
| 6,304,764 B1 * | 10/2001 | Pan .......................... | 455/569.2 |
| 6,434,403 B1 * | 8/2002 | Ausems et al. .......... | 455/556.2 |
| 6,480,098 B2 * | 11/2002 | Flick .......................... | 340/7.2 |

* cited by examiner

Primary Examiner—Lester G. Kincaid
Assistant Examiner—James Moore

(57) ABSTRACT

A personal digital assistant-vehicle interface system, for use with a personal digital assistant including a memory defining a database, a microprocessor coupled to the memory, an input/output device coupled to the microprocessor, and a serial output port coupled to the microprocessor, the personal digital assistant being configured to provide data to the output port indicating a predetermined event has occurred in response to occurrence of the predetermined event, the interface system including actuator circuitry including a digital to analog converter having a digital input configured to be coupled to the serial output port of the personal digital assistant, having an analog output, and being configured to provide an analog signal in response to the serial data being applied to the digital input, the analog output being configured to be coupled to an electrically actuated vehicle component that, when actuated, is audible or visible, the actuator circuitry being configured to effect actuation of the vehicle component in response to the data being provided to the digital input of the digital to analog converter. A method including providing a personal digital assistant including a memory defining a database, a microprocessor coupled to the memory, an input/output device coupled to the microprocessor, and an output port coupled to the microprocessor; configuring the personal digital assistant to provide data to the output port indicating a predetermined event has occurred in response to occurrence of the predetermined event; converting digital data at the output port to an analog signal to provide an analog signal in response to occurrence of the predetermined event; and using the analog signal to actuate an electrically actuated vehicle component that, when actuated, is audible or visible, such that actuation of the vehicle component is effected in response to occurrence of the predetermined event.

25 Claims, 3 Drawing Sheets

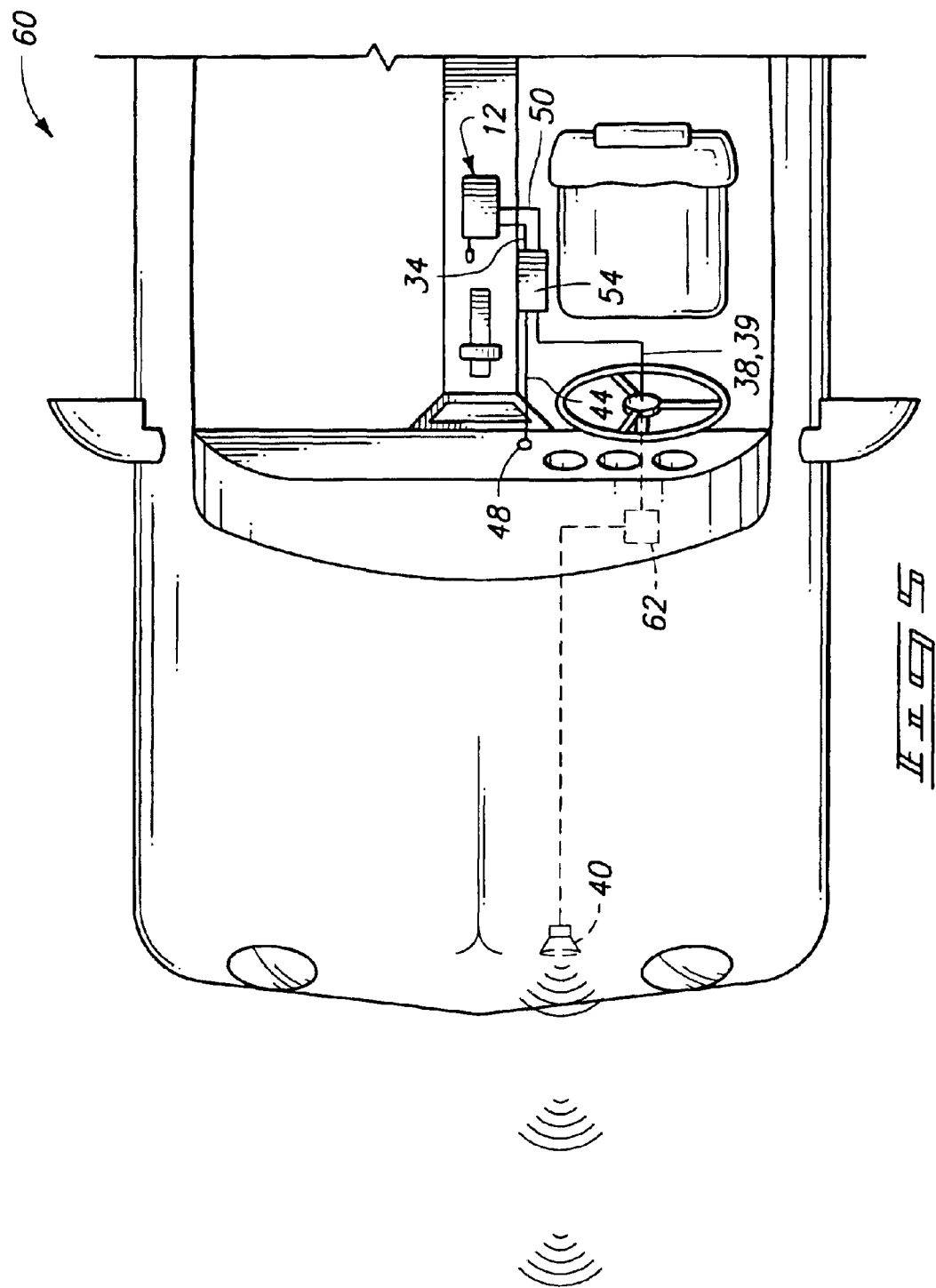

PERSONAL DIGITAL ASSISTANT VEHICLE INTERFACE AND METHOD

FIELD OF THE INVENTION

The invention relates to portable computers. The invention also relates to personal digital assistants and event notifications.

BACKGROUND OF THE INVENTION

Personal digital assistants are known in the art. A personal digital assistant is portable, typically hand held, computer having a microprocessor, a memory defining a database, and an input/output device such as a touchscreen or a screen and a keyboard. The database is typically for storing calendar or scheduling information and for storing contact information such as names, addresses, e-mail addresses, phone numbers, and associated information. PDAs include, for example, the Palm™ or Palm Pilot™ available from Palm Inc., 5470 Great America Parkway, Santa Clara, Calif., USA 95052, as well as devices that use versions of the Windows™ CE operating system or variations thereon, personal information managers, organizers, and other computers smaller than notebook computers. Some such devices, such as the Palm VII™ have wireless modems and provide wireless access to e-mail and certain web sites. Some Internet web sites are developed for such devices and provide simplified content and navigation. Some mobile phones, including those with the EPOC™ operating system, can be considered to be PDAs.

Such a device typically has an output, such as a serial output, which can be used for coupling the device to a docking station or cradle or to some other peripheral equipment such as a mouse, modem, camera or other imaging device, etc. Alternatively, the device or cradle can include an optical (e.g. infrared) input/output capability.

SUMMARY OF THE INVENTION

The invention provides a PDA-vehicle interface for use with a personal digital assistant of the type including a memory defining a database, a microprocessor coupled to the memory, an input/output device coupled to the microprocessor, and an output port coupled to the microprocessor. The personal digital assistant is configured to provide data to the output port indicating a predetermined event has occurred in response to occurrence of the predetermined event. The interface includes actuator circuitry including a digital to analog converter having a digital input coupled to the output port, having an analog output, and being configured to provide an analog signal in response to the data being applied to the digital input. In one aspect of the invention, the data is serial data. The analog output is configured to be coupled to an electrically actuated vehicle component that, when actuated, is audible or visible. The actuator circuitry is configured to effect actuation of the vehicle component in response to the data being provided to the digital input of the digital to analog converter.

Another aspect of the invention provides a method comprising providing a personal digital assistant including a memory defining a database, a microprocessor coupled to the memory, an input/output device coupled to the microprocessor, and an output port coupled to the microprocessor. The personal digital assistant is configured to provide data to the output port indicating a predetermined event has occurred in response to occurrence of the predetermined event. Digital data at the output port is converted to an analog signal to provide an analog signal in response to occurrence of the predetermined event. The analog signal is used to actuate an electrically actuated vehicle component that, when actuated, is audible or visible, such that actuation of the vehicle component is effected in response to occurrence of the predetermined event.

In one aspect of the invention, the vehicle component is a horn.

In another aspect of the invention, the vehicle component is a light.

In another aspect of the invention, the personal digital assistant includes a rechargeable battery, and the battery of the personal digital assistant is charged using power from the vehicle.

DESCRIPTION OF THE DRAWINGS

FIG. 5 is a partial plan view of a vehicle coupled to the system of FIG. 1.

DETAILED DESCRIPTION OF THE INVENTION

Figure 1:
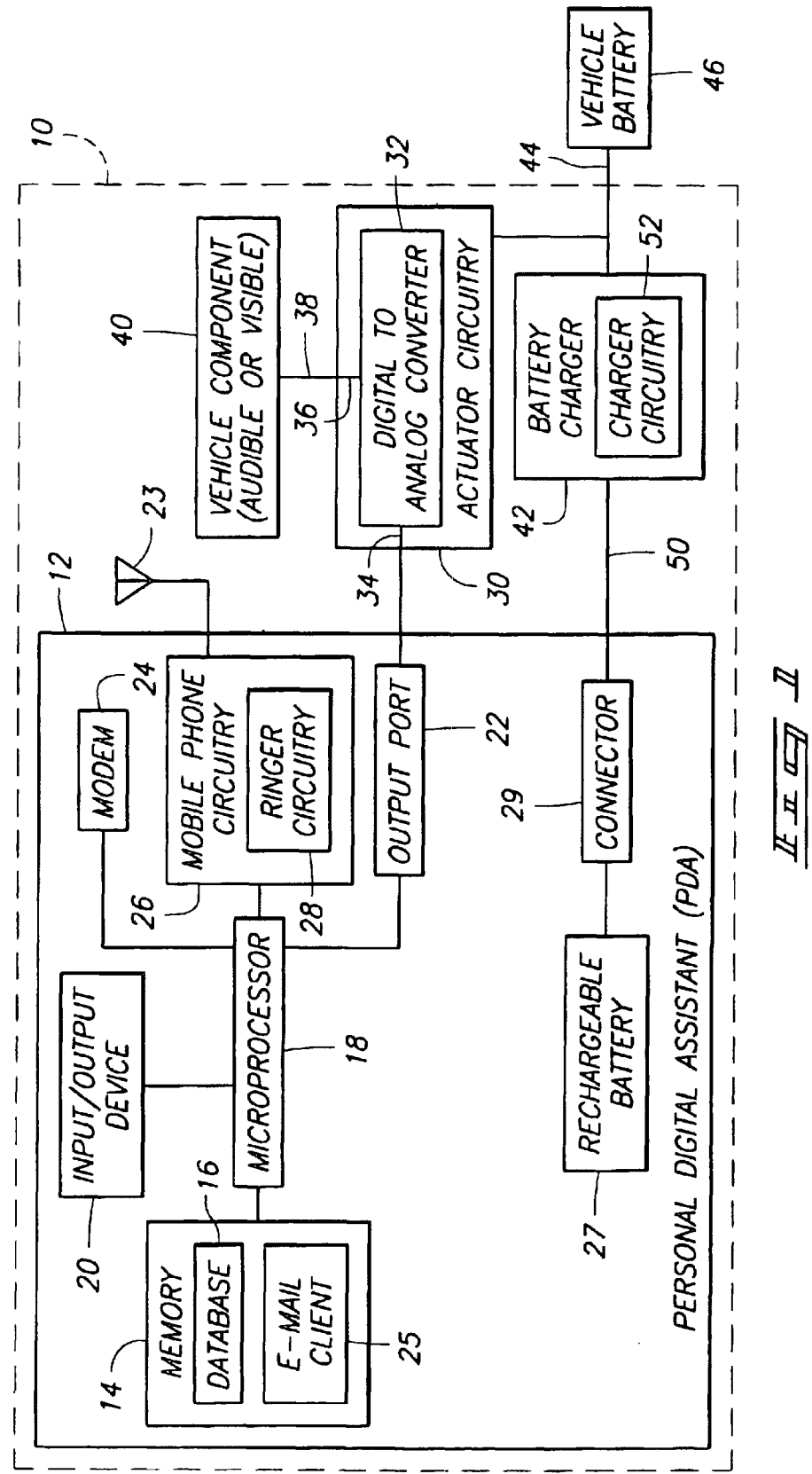
FIG. 1 is a block diagram illustrating a system in accordance with one embodiment of the present invention.

FIG. 1 shows a system 10 in accordance with one aspect of the invention. The system 10 includes a personal digital assistant (PDA) 12.

Figure 2:
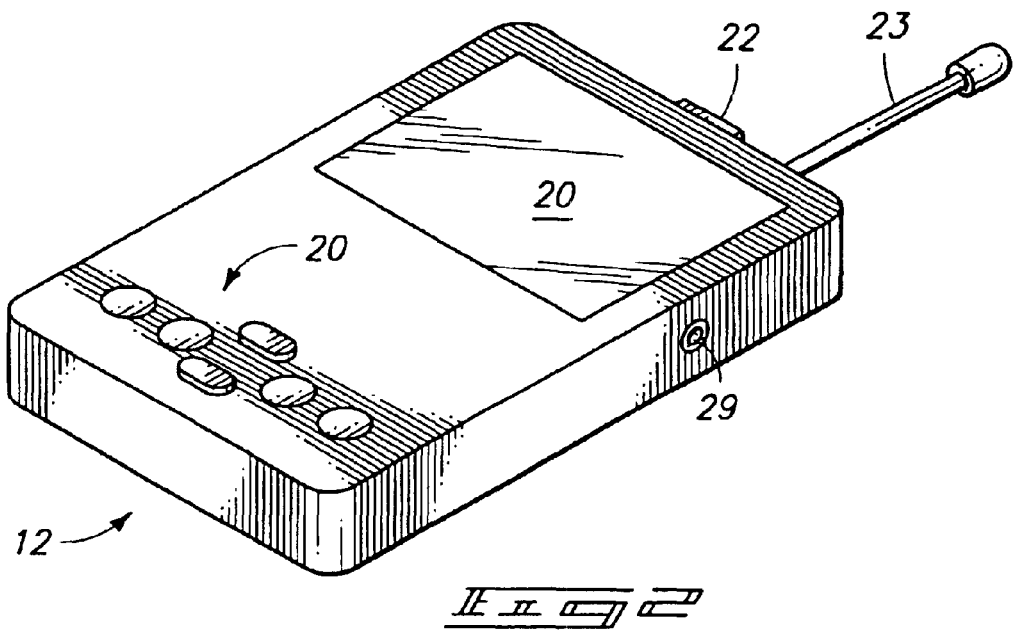
FIG. 2 is a perspective view of a personal digital assistant, in accordance with an embodiment of the present invention.
Figure 3:
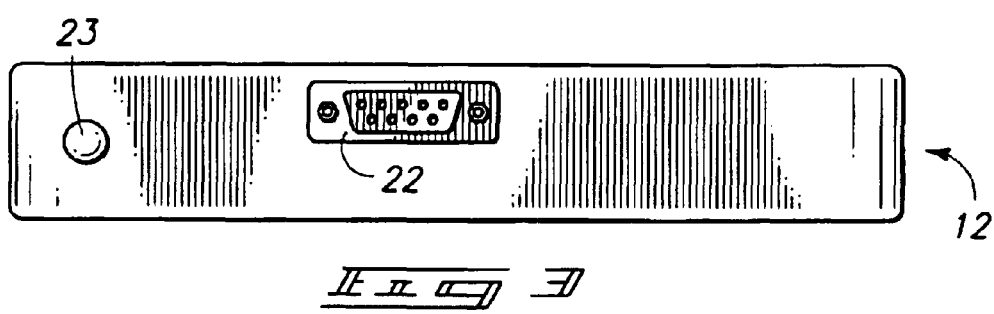
FIG. 3 is a top view of the personal digital assistant of FIG. 2.

The personal digital assistant 12 is a portable, hand held, computer having a memory 14 defining a database 16, a microprocessor 18 coupled to the memory 14 (or itself including the memory 14) and configured to act on the database 16, an input/output device 20 (see also FIG. 2), such as a touchscreen or a screen and a keyboard, coupled to the microprocessor 18, and an output port 22 (see also FIGS. 2 and 3) coupled to the microprocessor 18. In the illustrated embodiment, the output port 22 is a serial output port. It should be understood that personal digital assistant could include other data ports such as a parallel port, an optical port, infrared port, a 10BaseT port, or any combination of such data ports.

The database 16 is arranged to store calendar or scheduling information. For example, different planned activities/appointments can be entered, using the input/output device 20, for specific times (or time ranges) on specific dates (or date ranges) and an alarm event will occur a predetermined amount of time before the scheduled activity, to remind the user of the personal digital assistant 12 that the time for the activity is approaching. The database 16 also includes fields for storing contact information such as names, addresses, e-mail addresses, phone numbers, and associated information, as is known in the art.

The personal digital assistant 12 can be similar to, for example, the Palm™ or Palm Pilot™ available from Palm Inc., 5470 Great America Parkway, Santa Clara, Calif., USA 95052. Alternatively, the personal digital assistant 12 can be similar to other existing devices that use the Windows™ CE operating system or variations of the Windows™ CE operating system.

In the illustrated embodiment, the personal digital assistant 12 has a modem 24, coupled to the microprocessor 18. The modem 24 is capable of wireless communications (using a mobile telephone network, such as a cell phone network, for example) and provides wireless access to e-mail and certain web sites. Some Internet web sites are developed for such devices and provide simplified content and navigation.

In one embodiment, the personal digital assistant 12 includes mobile phone circuitry 26, including ringer circuitry 28 configured to provide a signal to actuate ringing when a phone call initiation attempt is being received. The mobile phone circuitry 26 is used by the modem 24. The personal digital assistant further includes an antenna 23 (see FIGS. 2 and 3) coupled to the mobile phone circuitry 26.

The personal digital assistant 12 further includes an e-mail client 25 (e.g., software included in the memory 14 that is executed by the microprocessor 18), and is configured to provide data to the output port 22 indicating that an e-mail has been received in response to an e-mail being received. The e-mail is received via the wireless modem 24. In an alternative embodiment, e-mail can be received using a modem (not shown) that uses conventional telephone lines.

In one embodiment, the personal digital assistant 12 further includes a rechargeable battery (or batteries) 27 coupled to supply power to the microprocessor 18, memory 14, I/O device 10, modem 24, mobile phone circuitry 26, and any other component of the personal digital assistant 12 that requires power. The personal digital assistant has a battery charger connector port 29 (see also FIG. 2), configured to be coupled to an output connector of a battery charger.

The personal digital assistant 12 is configured to provide data to the output port 22 indicating a predetermined event (such as the above-described alarm event) has occurred in response to occurrence of the predetermined event. Besides a scheduling/appointment alarm, as described above, the predetermined event can also be, for example, receipt of a new e-mail, ringer circuitry 28 indicating that the mobile phone 26 is ringing, etc. For example, the personal digital assistant 12 is configured to provide data to the output port 22 indicating that a phone call initiation attempt is being received, in response to the ringer circuitry 28 indicating that a phone call initiation attempt is being received. In one embodiment, the personal digital assistant further includes a speaker (not shown) to produce a sound in response to the occurrence of such predetermined events.

The system 10 further includes actuator circuitry 30 including a digital to analog converter 32 having a digital input 34 coupled to the output port 22, having an analog output 36, and being configured to provide an analog signal in response to the data being applied to the digital input 34.

In one embodiment, the actuator circuitry 30 is configured to effect a pattern of actuations (e.g. honk twice, pause, honk twice) in response to the data being provided to the digital input 34 of the digital to analog converter 32 or just a single actuation (e.g. one honk for one second). In another embodiment, the actuator circuitry 30 is configured to generate different patterns of actuations for different predetermined events to distinguish between different types of predetermined events (e.g. honk once for e-mail, honk twice in a row for an incoming phone call, or simulate a tune for phone call, etc.).

The analog output 36 is configured to be coupled via conductors 38 and 39 to an electrically actuated vehicle component 40 that, when actuated, is audible or visible. The actuator circuitry 30 effects actuation of the vehicle component 40 in response to the data being provided to the digital input 34 of the digital to analog converter 32. In one embodiment, the actuator circuitry 30 effects actuation of the vehicle component 40 by providing power to the vehicle component 40. In another embodiment (not shown), the actuator circuitry 30 triggers or enables control circuitry (such as a relay or transistor) that controls the vehicle component 40.

The system 10 further includes a battery charger 42 having a power input plug connector 44 configured to be coupled to a vehicle battery 46, such as via a cigarette lighter power port 48 (shown in FIG. 5) or via a vehicle fusebox 62 (see FIG. 5), or coupled directly to the vehicle battery 46. The battery charger 42 has an output connector 50 which is selectively coupled to the battery charger input connector 29 of the personal digital assistant 12. The battery charger 42 includes charger circuitry 52, which is designed for use with the type of battery 27 included in the personal digital assistant 12. For example, different charging ramps and patterns would be implemented by the charger circuitry 52 if the battery 27 were a lithium ion battery versus a nickle metal hydride battery.

Figure 4:
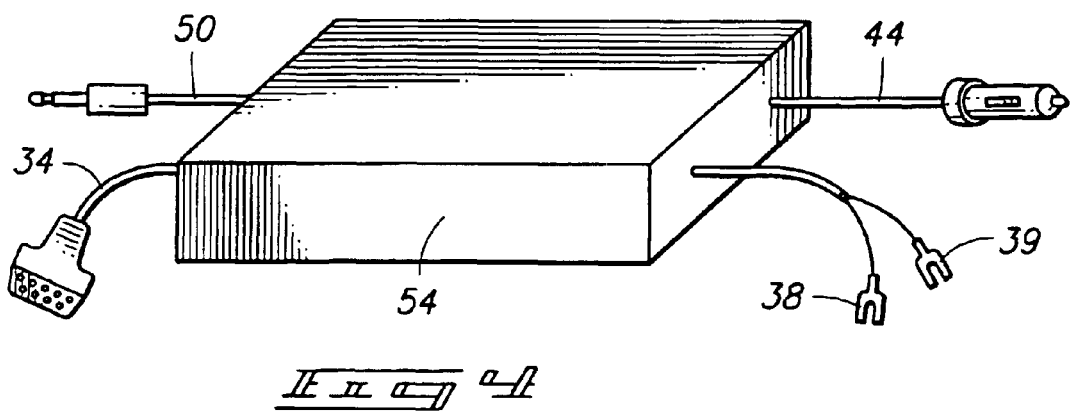
FIG. 4 is a perspective view of a PDA-vehicle interface, in accordance with one embodiment of the invention.

In one embodiment (see FIG. 4), the system 10 further comprises a common housing 54 supporting the digital to analog converter 32 and the battery charger 42. Other embodiments are possible.

FIG. 5 shows a portion of a vehicle 60. Though the vehicle shown is an automobile, the invention also has application to other vehicles, such as other types of land vehicles (e.g., trucks, jeeps, motorcycles, tractors, etc.) or to non-land vehicles (e.g., boats). The digital input 34 (see FIG. 4) and battery charger output 50 are coupled to the personal digital assistant 12, and the conductors 38 and 39 and plug 44 are coupled to the vehicle 60. More particularly, the plug 44 is selectively coupled to the cigarette lighter or power port 48 of the vehicle (or to the fusebox 62 or directly to the vehicle battery 46). The conductors 38 and 39 are coupled to circuitry for actuating the component 40, such as to a switch or to the fusebox 62 of the vehicle (e.g. with a connector that is the same size and shape as a fuse, in which case an in-line fuse would be included in the conductor 38 or 39 or a fuse is provided in the housing 54).

In an alternative embodiment, a mobile phone, such as a cellular phone or GSM phone, is substituted for the personal digital assistant. The mobile phone includes mobile phone circuitry similar to the circuitry 28, ringer circuitry similar to the ringer circuitry 28, and a rechargeable battery, and is coupled to an interface that effects actuation of an audible or visible vehicle component in response to the ringer circuitry indicating that a phone call is being received. In one embodiment, this vehicle-phone interface further includes a battery charger having a connector configured to mate with a battery charger input connector of the phone, for charging the phone from the vehicle (e.g. the vehicle-phone interface includes a connector for use with a vehicle's cigarette lighter/power port, or a connector for coupling to a power output in the vehicle fusebox, etc.).

Thus, an interface has been provided that allows a user of a personal digital assistant to leave their personal digital assistant in their vehicle when they are away from but nearby the vehicle, and still be informed of event notifications. For example, a horn will honk, or a headlight will flash, when the personal digital assistant would normally beep via a speaker. This can be very useful if, for example, the user of the personal digital assistant wishes to charge the batteries of the personal digital assistant using power from the vehicle, yet still wishes to receive notifications.

The protection sought is not to be limited to the disclosed embodiments, which are given by way of example only, but instead is to be limited only by the scope of the appended claims.

What is claimed is:

1. A system comprising:

a personal digital assistant including a memory defining a database, a microprocessor coupled to the memory, an input/output device coupled to the microprocessor, a wireless modem coupled to the microprocessor, and an output port coupled to the microprocessor, the personal digital assistant being configured to provide data to the output port indicating a predetermined event has occurred in response to occurrence of the predetermined event; and actuator circuitry including a digital to analog converter having a digital input coupled to the output port, having an analog output, and being configured to provide an analog signal in response to the data being applied to the digital input, and the actuator circuitry including a conductor configured to be coupled between a vehicle's horn and the analog output of the digital to analog converter, the actuator circuitry being configured to effect different patterns of honking of the horn for different predetermined events in response to the data being provided to the digital input of the digital to analog converter to distinguish between different types of predetermined events.

2. A system in accordance with claim 1 wherein the personal digital assistant includes an e-mail client, and is configured to provide data to the output port indicating that an e-mail has been received in response to an e-mail being received via the wireless modem.

3. A system in accordance with claim 1 wherein the personal digital assistant includes mobile phone circuitry, including ringer circuitry configured to provide a signal to actuate ringing when a phone call initiation attempt is being received, wherein the personal digital assistant is configured to provide data to the output port indicating that a phone call initiation attempt is being received, in response to the ringer circuitry indicating that a phone call initiation attempt is being received.

4. A system in accordance with claim 1 further comprising a battery charger comprising an output connector and a power input plug connector configured to be coupled to a vehicle cigarette lighter power port and, the personal digital assistant further comprises a rechargeable battery and a connector port configured to be coupled to the output connector of the battery charger.

5. A system in accordance with claim 4 wherein the actuator circuitry is coupled to the power input plug connector.

6. A system in accordance with claim 4 wherein the battery charger further comprises charger circuitry, and the system further comprises a common housing supporting the digital to analog circuitry and the charger circuitry.

7. A system comprising:

a personal digital assistant including a memory defining a database, a microprocessor coupled to the memory, an input/output device coupled to the microprocessor, a wireless modem coupled to the microprocessor, and an output port coupled to the microprocessor, the personal digital assistant being configured to provide data to the output port indicating a predetermined event has occurred in response to occurrence of the predetermined event, wherein the personal digital assistant includes an e-mail client, and is configured to provide data to the output port indicating that an e-mail has been received in response to an e-mail being received via the wireless modem; and actuator circuitry including a digital to analog converter having a digital input coupled to the output port, having an analog output, and being configured to provide an analog signal in response to the data being applied to the digital input, and the actuator circuitry including a conductor configured to be coupled between a vehicle's horn and the analog output of the digital to analog converter, the actuator circuitry being configured to effect honking of the horn in response to the data being provided to the digital input of the digital to analog converter.

8. A system in accordance with claim 7 further including a battery charger having a power input plug connector configured to be coupled to a vehicle cigarette lighter power port and having an output connector, wherein the personal digital assistant includes a rechargeable battery and has a connector port configured to be coupled to the output connector of the battery charger.

9. A system in accordance with claim 8 wherein the actuator circuitry is coupled to the power input plug connector, to be powered by the vehicle.

10. A system in accordance with claim 8 wherein the battery charger includes charger circuitry, and wherein the system further comprises a common housing supporting the digital to analog circuitry and the charger circuitry.

11. A system in accordance with claim 7 wherein the actuator circuitry is configured to effect a pattern of discrete spaced apart honks in response to the data being provided to the digital input of the digital to analog converter.

12. A system in accordance with claim 11 wherein the actuator circuitry is configured to generate different patterns of honks for different predetermined events to distinguish between different types of predetermined events.

13. A system in accordance with claim 7 wherein the personal digital assistant further includes mobile phone circuitry, including ringer circuitry configured to provide a signal to actuate ringing when a phone call initiation attempt is being received, wherein the personal digital assistant is further configured to provide data to the output port indicating that a phone call initiation attempt is being received, in response to the ringer circuitry indicating that a phone call initiation attempt is being received.

14. A personal digital assistant-vehicle interface system, for use with a personal digital assistant including a memory defining a database, a microprocessor coupled to the memory, an input/output device coupled to the microprocessor, and a serial output port coupled to the microprocessor, the personal digital assistant being configured to provide data to the output port indicating a predetermined event has occurred in response to occurrence of the predetermined event, the interface system comprising:

actuator circuitry including a digital to analog converter having a digital input configured to be coupled to the serial output port of the personal digital assistant, having an analog output, and being configured to provide an analog signal in response to the serial data being applied to the digital input, the analog output being configured to be coupled to an electrically actuated vehicle component that, when actuated, is audible or visible, the actuator circuitry being configured to effect actuation of the vehicle component in response to the data being provided to the digital input of the digital to analog converter, wherein the actuator circuitry is configured to effect different patterns of actuations for different predetermined events in response to the data being provided to distinguish between different types of predetermined events.

15. A system in accordance with claim 14 wherein the personal digital assistant further comprises a battery charger connector, and further comprising a battery charger comprising a power input plug connector configured to be coupled to a vehicle cigarette lighter power port and an output connector configured to be coupled to the battery charger connecter of the personal digital assistant, the system further comprising a housing enclosing both the battery charger and the actuator circuitry.

16. A system in accordance with claim 15 and further comprising a personal digital assistant including a memory defining a database, a microprocessor coupled to the memory, an input/output device coupled to the microprocessor, and an output port coupled to the microprocessor, the personal digital assistant being configured to provide data to the output port indicating a predetermined event has occurred in response to occurrence of the predetermined event.

17. A system in accordance with claim 16 wherein the personal digital assistant includes a wireless modem coupled to the microprocessor, and includes an e-mail client, and is configured to provide data to the output port indicating that an e-mail has been received in response to an e-mail being received via the wireless modem.

18. A system in accordance with claim 16 wherein the personal digital assistant includes mobile phone circuitry, including ringer circuitry configured to provide a signal to actuate ringing when a phone call initiation attempt is being received, wherein the personal digital assistant is configured to provide data to the output port indicating that a phone call initiation attempt is being received, in response to the ringer circuitry indicating that a phone call initiation attempt is being received.

19. A system in accordance with claim 15 wherein the actuator circuitry is coupled to the power input plug connector, to be powered by the vehicle.

20. A personal digital assistant-vehicle interface system, for use with a personal digital assistant including a serial output port, a wireless modem and an e-mail client, the personal digital assistant being configured to provide data to the output port indicating a predetermined event has occurred in response to occurrence of the predetermined event and to provide data to the output port indicating that an e-mail has been received in response to an e-mail being received via the wireless modem, the interface system comprising:

actuator circuitry including a digital to analog converter having a digital input configured to be coupled to the serial output port of the personal digital assistant, having an analog output, and being configured to provide an analog signal in response to the serial data being applied to the digital input, the analog output being configured to be coupled to an electrically actuated vehicle component that, when actuated, is audible or visible, the actuator circuitry being configured to effect actuation of the vehicle component in response to the data being provided to the digital input of the digital to analog converter.

21. A system in accordance with claim 20 wherein the personal digital assistant further includes mobile phone circuitry, including ringer circuitry configured to provide a signal to actuate ringing when a phone call initiation attempt is being received, wherein the personal digital assistant is configured to provide data to the output port indicating that a phone call initiation attempt is being received, in response to the ringer circuitry indicating that a phone call initiation attempt is being received.

22. A system in accordance with claim 20 further comprising a battery charger comprising an output connector and a power input plug connector configured to be coupled to a vehicle cigarette lighter power port and, the personal digital assistant further comprises a rechargeable battery and a connector port configured to be coupled to the output, connector of the battery charger.

23. A system in accordance with claim 22 wherein the actuator circuitry is coupled to the power input plug connector.

24. A system in accordance with claim 20 wherein the actuator circuitry is configured to effect a pattern of actuations of the vehicle component in response to the data being provided to the digital input of the digital to analog converter.

25. A system in accordance with claim 24 wherein the actuator circuitry is configured to generate different patterns of actuations for different predetermined events to distinguish between different types of predetermined events.

* * * * *